United States Patent

Mueller et al.

Patent Number: 5,995,211
Date of Patent: Nov. 30, 1999

[54] METHOD FOR DETERMINING THE RATE OF ROTATION

[75] Inventors: Reinhard Mueller, Puchheim; Gert Trommer, Munich, both of Germany

[73] Assignee: DaimlerChrysler Aerospace Aktiengesellschaft, Germany

[21] Appl. No.: 09/027,906

[22] Filed: Feb. 23, 1998

[30] Foreign Application Priority Data

Feb. 21, 1997 [DE] Germany .......................... 197 06 858

[51] Int. Cl.⁶ .................................................. G01N 21/00
[52] U.S. Cl. ............................................................ 356/73.1
[58] Field of Search .................................... 356/350, 149; 350/96.15; 250/227.19

[56] References Cited

U.S. PATENT DOCUMENTS

| | | | |
|---|---|---|---|
| 4,440,498 | 4/1984 | Sheem | 356/350 |
| 5,430,544 | 7/1995 | Poisel et al. | 356/350 |
| 5,767,509 | 6/1998 | Cordova et al. | 356/350 |

FOREIGN PATENT DOCUMENTS 39 19 060  of 1990  Germany .
41 20 675  of 1992  Germany .

*Primary Examiner*—Robert H. Kim
*Assistant Examiner*—Tu T. Nguyen
*Attorney, Agent, or Firm*—Evenson, McKeown, Edwards & Lenahan, P.L.L.C.

[57] ABSTRACT

A method and apparatus for determining a rate of rotation uses a fiber-optic gyro which has a 3×3-coupler. A first channel of the coupler is optically connected on one side with a light source and on the other side with a first photo element; and the two other channels are optically connected on one side with a fiber coil and on the other side with a second and third photo element respectively. A depolarizer is arranged at least between the light source and the 3×3-coupler or at one end of the fiber coil; alternatively, the fiber coil has a polarization-maintaining fiber. An electronic signal processing system is used to determine a temperature-related value, independent of the rate of rotation, for damping of the fiber coil and of the 3×3-coupler, based on the signals of the three photo elements and from temperature-dependent coefficients determined by calibration. Then the rate of rotation is computed based on the signals of the three photo elements, the temperature-dependent coefficients and the computed, temperature-related value for the damping.

6 Claims, 2 Drawing Sheets

METHOD FOR DETERMINING THE RATE OF ROTATION

BACKGROUND and SUMMARY OF THE INVENTION

This application claims the priority of German patent document no. 197 06 858.8, the disclosure of which is expressly incorporated by reference herein.

The invention relates to a method for determining a rate of rotation by means of a fiber-optic gyro.

The fiber-optic gyro according to the invention has a 3×3-coupler with a first channel which is optically connected on one side with a light source and on the other side with a first photo element. The two other channels of the 3×3-coupler are optically connected on one side with respective ends of a fiber coil and on the other side with a second or third photo element respectively. A depolarizer is arranged at least between the light source and the 3×3-coupler or at one end of the fiber coil and/or the fiber coil having a polarization-maintaining fiber.

U.S. Pat. No. 4,440,498, discloses a fiber-optic gyro with a 3×3-coupler which operates close to-the so-called quadrature point, without requiring a modulator. Furthermore, U.S. Pat. No. 4,479,715 discloses a fiber-optic gyro with a modified 3×3-coupler which derives the rate of rotation from the quotient of the difference and the sum of two photo elements. The advantage of this signal analyzing process is that the intensity of the light source is cancelled out and its fluctuations therefore have no influence on the measuring signal. Furthermore, in this quotient formation, a variable coil damping is also cancelled out. However, a disadvantage of this simple quotient analysis is the limited usable range of the Sagnac phase at a value within $\pm\pi/2$, typically $\pm\pi/3$.

Furthermore, German Patent Document DE 39 12 005 C2, provides a signal analysis method for a fiber-optic gyro which compensates for contrast fluctuations by pseudo-statistical polarization fluctuations of the light in the fiber coil by computing processes. Also, in *Applied Optics*, Vol. 29, 1990, Pages 5360 and on, the rate of rotation for a fiber-optic gyro having a 3×3-coupler is computed by placing the sum or difference signal of the above-mentioned photo element signals in relation to the rate of rotation, to the contrast of the interference signal, to six different temperature-dependent coefficients as well as to the damping of the optical elements, particularly the fiber coil. The temperature-dependent coefficients are determined by calibration of the gyro, and depend only on the light source, the coupler (or couplers in the case of multi-axis gyros), and the photo elements, these values being easily reproducible in the case of recurring temperatures. The contrast depends on the characteristics of the coil and the polarization of the light. The damping of the light in the optical components, particularly in the fiber, is a function of temperature and is subject to an environmentally caused aging. In addition, in contrast to the other temperature-dependent coefficients, the damping has a comparatively large hysteresis in the case of changing temperature courses.

According to German Patent Document DE 39 12 005 C2, the contrast can be eliminated from the above-mentioned equations for the sum or difference signal. The advantage to the initially described quotient analyzing method is that the usable range of the Sagnac phase can be expanded to $\pm\pi$, thus to approximately the triple value. However, the determined rate of rotation still depends on the fiber damping. For this reason, it was attempted according to German Patent Document DE 39 19 060 C2 to calculate the value of the damping by means of a recursive algorithm. However, this is successful only if the gyro signals are known at the 0 rate of rotation and at a rate of rotation other than 0. The latter results in a significant operational limitation since, after switching-on the gyro, the 0 rate of rotation must exist at least once; in addition, the relatively long computing times required for the recursive algorithm impair the measuring speed of the gyro.

It is therefore an object of the present invention to provide a method for determining the rate of rotation of a fiber-optic gyro by means of which the influence of any damping variations on the measuring signals can at least be reduced.

This and other objects and advantages are achieved by the method according to the invention, which is based on the consideration that, when stabilizing the contrast (for example, by using polarization-maintaining fibers according to German Patent Document DE 41 34 312, or using a fiber which is not polarization-maintaining, by means of an additional depolarizer or several depolarizers according to German Patent Document DE 41 20 675 and German Patent Document DE 39 42 819) the equations for the gyro signal analysis known from the above-mentioned *Applied Optics* document can be solved for the damping. The rate of rotation can then be determined by means of a damping value computed in this manner, together with the remaining measuring signals.

Other objects, advantages and novel features of the present invention will become apparent from the following detailed description of the invention when considered in conjunction with the accompanying drawings.

DETAILED DESCRIPTION OF THE DRAWINGS

Figure 1:
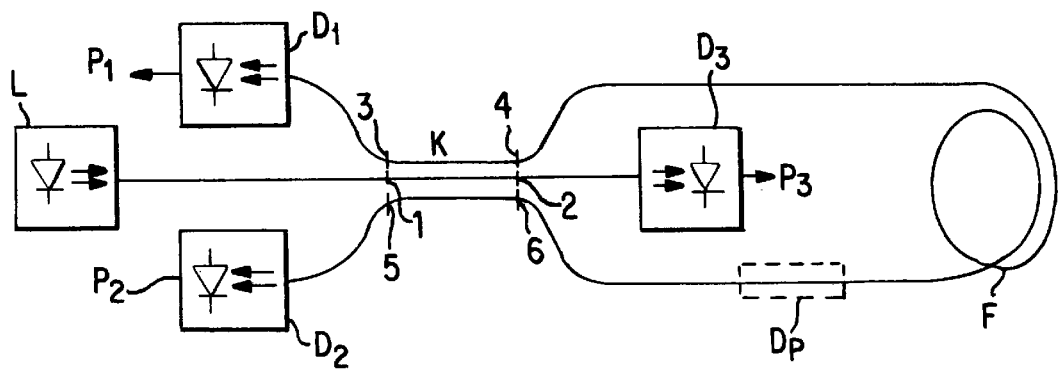
FIG. 1 is a view of a single-axis fiber-optic gyro having a 3×3-coupler.

In the single-axis fiber-optical gyro illustrated in FIG. 1, the light of a light-emitting diode L, for example, an edge-emitting diode (ELED), is coupled into the input 1 of a channel of a 3×3-coupler K. The output 2 of this channel is optically connected with a first photo element, the so-called monitor diode $D_3$. The outputs 4 and 6 of the two other channels of the 3×3-coupler K are connected with a fiber coil F, with second or third photo element D1 and D2 respectively being connected at the coupling points 3 and 5 of these channels.

The optical fiber of the coil F may be polarization-maintaining; or alternatively, a non-polarization-maintaining fiber may be used, with a depolarizer DP applied between at least one coil end and the coupler K. The output signals $P_1$, $P_2$ and $P_3$ of the photo elements $D_1$, $D_2$ and $D_3$ are now related to by the is following equations.

$$P_1-P_2=P_{Dif}=[-f_1+k\,f_z(\sin\Phi\,\cos\,x_4+\cos\Phi\,\sin\,x_4)]\,d\,P_3 \quad (1)$$

$$P_1-P_2=P_{Sum}=[f_2+k\,f_n(\cos\Phi\,\sin\,x_5+\sin\Phi\,\cos\,x_5)]\,d\,P_3 \quad (2)$$

wherein $\Phi$=Sagnac phase (proportional to the rate of rotation to be measured)

k=contrast of the interference signal $f_1$, $f_2$, $f_z$, $f_n$, $x_4$, $x_5$=temperature-dependent coefficients
d=damping of the fiber coil including all spliced connections.

As mentioned above, the damping d includes the damping of the fiber coil and of the pertaining splice, as well as the damping of the 3×3-coupler. In the case of a multi-axis gyro, d even includes a changed coupling ratio of the distributing coupler V because, as the result of the mathematical elimination of d, a changed coupling ratio is also eliminated.

The above-mentioned equations (1) and (2) can be used to determine the Sagnac phase $\Phi$. The above-mentioned temperature-dependent coefficients $f_1$ to $x_5$ are determined by measurement. As mentioned above, they depend on the light source L, the coupler K and the photo elements D1, D2 and D3.

By using a polarization-maintaining fiber for the fiber coil F or by using a depolarizer DP, the contrast can be kept constant, specifically at 1 in the former case or at 0.5 in the latter case. Based on the above, the equations (1) and (2) can be solved for the damping d (in addition to the Sagnac phase $\Phi$) as follows:

$$d=(-B\pm(B^2-A\,C)^{1/2})/A \text{ with}$$

$$A=(P_3\,f_1\,f_n)^2+(P_3\,f_2\,f_x)^2-2\,P_3^2\,f_1\,f_2\,f_z\,f_n\,\sin(x_5-x_4)-(\cos(x_5-x_4)\,P_3\,k\,f_z\,f_n)^2$$

$$B=(P_3\,P_{Dif}\,f_1\,f_n^2-(P_3\,P_{Sum}\,f_2\,f_z^2+P_3\,(f_1\,P_{Sum}-f_2\,P_{Dif})\sin(x_5-x_4)\,f_z\,f_n$$

$$C=(P_{Dif}\,f_n)^2+(P_{Sum}\,f_z)^2+2\,P_{Dif}\,P_{Sum})\,f_z\,f_n\,\sin(x_5-x_4).$$

It can be seen from the foregoing that the damping d is independent of the rate of rotation $\Phi$, and can therefore be computed by means of the above equation, based on measured values. The damping value d thus computed can then be used in equations (1) and (2), to obtain the value for the rate of rotation $\Phi$.

Another alternative for solving the equation system is to solve for the product $P_3 \cdot d$. In this variant of the signal analysis, the photo diode $D_3$ is not required.

Since the indicated equations apply to 0 rates of rotation and rates other than 0, no special operating conditions must be maintained for the gyro.

Since the damping d generally changes only slowly, when the Sagnac phase is computed within a predetermined time period, a computed value for the damping d can be used several times until the latter must be newly computed.

Figure 3:
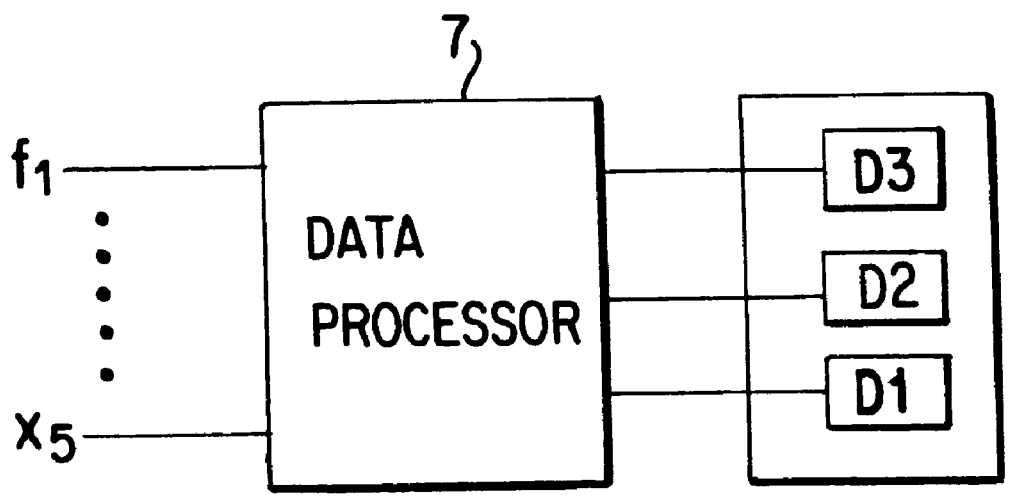
FIG. 3 shows an embodiment of a processor arrangement for performing the method according to the invention.

FIG. 3 shows an embodiment of a processor arrangement for performing the method according to the invention. A data processor 7, which has analog to digital conversion capability, is coupled to receive input signals from the respective photo diodes $D_1$–$D_3$, as well as the various measured values $f_1$, $f_2$, $f_z$, etc. Based on these inputs, the data processor 7 calculates the damping factor d in the manner described above, and uses it to determine the Sagnac phase $\Phi$. The programming of such a digital data processor for this purpose is well known to those skilled in the art.

Figure 2:
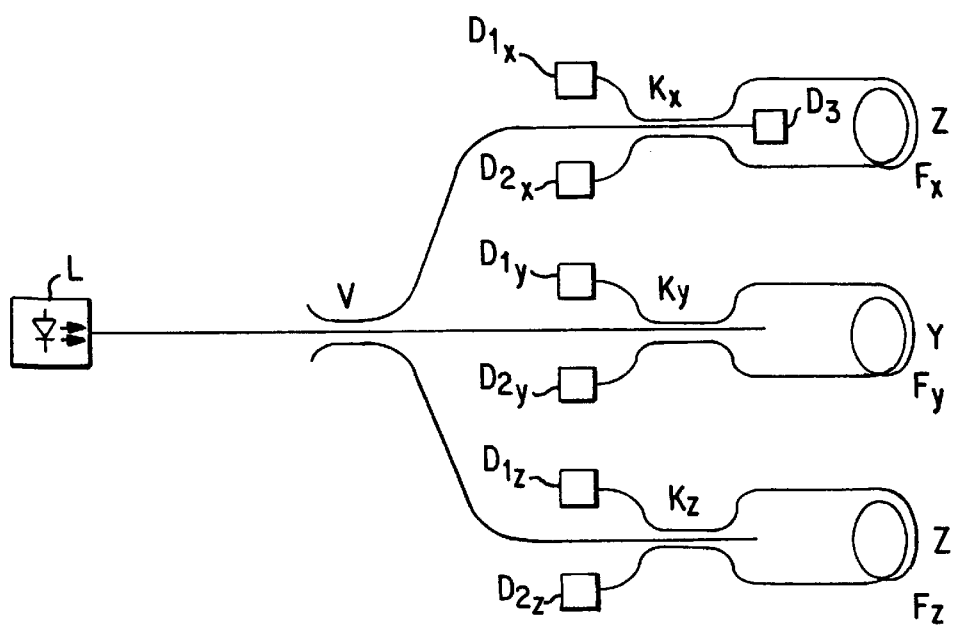
FIG. 2 is a three-axes fiber-optic gyro stack with a common light source.

The embodiment of a three-axis fiber-optic gyro stack illustrated in FIG. 2 has an arrangement according to FIG. 1 for the measuring axis X; however, the light source L must be connected by way of a light distributor V (for example, also a 3×3-coupler) with the central input of the 3×3-coupler $K_x$. The monitor diode $D_3$ is situated only in this branch. The fiber-optic gyros for the other measuring axes Y, Z are connected in the same manner by way of the distributor V with the light source L, but have no such monitor diode.

Concerning the individual components $\Phi_X$, $\Phi_Y$ and $\Phi_Z$, the algorithm described in FIG. 1 can now be applied, in which case the output signals of the diodes $D_{1x}$ and $D_{2x}$ or $D_{1y}$ and $D_{2y}$ or $D_{1z}$ and $D_{2z}$ are each used in combination with the output signal of $D_3$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for determining a rate of rotation by means of a fiber-optic gyro having a 3×3-coupler of which a first channel is optically connected on one side with a light source and on an opposite side with a first photo detector element, second and third channels of the 3×3-coupler being optically connected on one side with a fiber coil and on an opposite side with a second and third photo detector element respectively, and a depolarizer arranged at least between the light source and the 3×3-coupler or at one end of the fiber coil and/or the fiber coil having a polarization-maintaining fiber, said method comprising:

computing a temperature-related value, which is independent of the rate of rotation, for damping of the fiber coil and of the 3×3-coupler, by means of an electronic data processing system based on signals from the three photo detector elements and on temperature-dependent coefficients determined by calibration; and computing the rate of rotation based on the signals of the three photo detector elements, the temperature-dependent coefficients determined by calibration, and from the computed temperature-related value for the damping.

2. Method for determining a rate of rotation by means of a fiber-optic gyro having a 3×3-coupler of which a first channel is optically connected on one side with a light source, second and third channels of the 3×3-coupler being optically connected on one side with a fiber coil and on an opposite side with two photo detector elements respectively, and a depolarizer arranged at least between the light source and the 3×3-coupler or at one end of the fiber coil and/or the fiber coil having a polarization-maintaining fiber, said method comprising:

computing a temperature-related value, which is independent of the rate of rotation, for a product $d \cdot P_3$, by means of an electronic data processing system, based on signals of the two photo detector elements and on temperature-dependent coefficients determined by calibration, from the damping d and the optical output power of the first channel $P_3$; and computing the rate of rotation based on the signals of the two photo detector elements, the temperature-dependent coefficient determined by calibration and on the calculated, temperature-related value product $d \cdot P_3$.

3. Method according to claim 1, wherein:

said fiber optic gyro is a multi-axis fiber-optic gyro stack having one fiber coil respectively and one 3×3-coupler respectively for each measuring axis, the 3×3-couplers being connected by way of a fiber coupler with a light source;

only one 3×3-coupler of the fiber-optic gyro stack has a first photo element; and computing of the temperature-related damping of the individual fiber coils and the 3×3-coupler as well as of the rate of rotation in each measuring axis takes place by means of the same signal of the first photo element.

4. Method according to claim 2, wherein:

said fiber optic gyro is a multi-axes fiber-optic gyro stack having one fiber coil respectively and one 3×3-coupler respectively per measuring axis, the 3×3-couplers being connected by way of a fiber coupler with a light source;

each 3×3 coupler of a fiber-optic gyro axis is connected only with two photo elements; and in each axis the product $d.P_3$ is computed and from it the rate of rotation of the respective axis is computed.

5. Apparatus for determining a rate of rotation, comprising:

a fiber-optic gyro having a 3×3-coupler of which a first channel is optically connected at one side with a light source and on an opposite side with a first photo detector element, second and third channels of the 3×3-coupler being optically connected on one side with a fiber coil and on an opposite side with respective second and third photo detector elements, and a depolarizer arranged at least between the light source and the 3×3-coupler or at one end of the fiber coil;

a plurality of sensors for measuring values for determining temperature dependent coefficients for calibrating the fiber-optic gyro based on outputs from the fiber-optic gyro; and a data processor coupled to receive output signals from said first, second and third photo detector elements and from said sensors, said data processor including means for computing a temperature related value for damping of at least the fiber coil and the 3×3-coupler based on said output signals from said first, second and third photo detector elements and on said temperature-dependent coefficients, and said data processor further including means for computing said rate of rotation based on said output signals from said first, second and third photo detector elements, the temperature-dependent coefficients and the computed value for damping.

6. Apparatus for determining a rate of rotation, comprising:

a fiber-optic gyro having a 3×3-coupler of which a first channel is optically connected at one side with a light source and on an opposite side with a first photo detector element, second and third channels of the 3×3-coupler being optically connected on one side with a fiber coil comprising a polarization-maintaining fiber and on an opposite side with respective second and third photo detector elements;

a plurality of sensors for measuring values for determining temperature dependent coefficients for calibrating the fiber-optic gyro based on outputs from the fiber-optic gyro; and a data processor coupled to receive output signals from said first, second and third photo detector elements and from said sensors, said data processor including means for computing a temperature related value for damping of at least the fiber coil and the 3×3-coupler based on said output signals from said first, second and third photo detector elements and on said temperature-dependent coefficients, and said data processor further including means for computing said rate of rotation based on said output signals from said first, second and third photo detector elements, the temperature-dependent coefficients and the computed value for damping.

* * * * *